(12) United States Patent
Minevski et al.

(10) Patent No.: US 7,314,552 B2
(45) Date of Patent: Jan. 1, 2008

(54) ELECTROCHEMICAL METHOD AND APPARATUS FOR PRODUCING AND SEPARATING FERRATE(VI) COMPOUNDS

(75) Inventors: Zoran Minevski, The Woodlands, TX (US); Jason Maxey, College Station, TX (US); Carl Nelson, College Station, TX (US); Dylan Taylor, College Station, TX (US)

(73) Assignee: Lynntech, Inc., College Station, TX (US)

( * ) Notice: Subject to any disclaimer, the term of this patent is extended or adjusted under 35 U.S.C. 154(b) by 483 days.

(21) Appl. No.: 11/116,486

(22) Filed: Apr. 28, 2005

(65) Prior Publication Data

US 2005/0201912 A1    Sep. 15, 2005

Related U.S. Application Data

(62) Division of application No. 10/084,020, filed on Feb. 27, 2002, now Pat. No. 6,946,078.

(51) Int. Cl.
  *C01G 49/00* (2006.01)
  *B01D 35/06* (2006.01)
  *C02F 1/48* (2006.01)

(52) U.S. Cl. .............. 210/223; 210/695; 210/222; 209/213; 204/242

(58) Field of Classification Search .......... 210/695, 210/222, 223; 209/223; 204/242
See application file for complete search history.

(56) References Cited

U.S. PATENT DOCUMENTS

| | | |
|---|---|---|
| 2,714,089 A | 7/1955 | Meyer |
| 4,304,760 A | 12/1981 | Mein et al. |
| 4,370,228 A | 1/1983 | Tashiro et al. |
| 4,405,573 A | 9/1983 | Deininger et al. |

(Continued)

FOREIGN PATENT DOCUMENTS

WO    WO 98/50970    11/1998

(Continued)

OTHER PUBLICATIONS

Proceedings of the Symposium on Environmentally Acceptable Inhibitors and Coatings; The Electrochemical Society, Inc. vol. 95-16; pp. 133-135.

(Continued)

*Primary Examiner*—David A Reifsnyder
(74) *Attorney, Agent, or Firm*—Jeffrey L. Streets; Streets & Steele

(57) ABSTRACT

The method for separating ferrate salts from a solution comprising providing contact between the solution of essentially of aqueous hydroxide and the ferrate salts and a surface having a magnetic attraction, magnetically securing the ferrate salts to the surface; and eliminating contact between the solution and the surface. Contact is provided by immersing the surface in the solution, passing the liquid ferrate mixture over the surface, or combinations thereof. The magnetic attraction may be induced by permanent magnets, electromagnets, and combinations thereof. The apparatus for ferrate production comprises an electrochemical cell having an iron-containing anode, cathode, and an aqueous hydroxide solution in fluid communication with both the anode and the cathode, and a magnetic separator in fluid communication with the aqueous hydroxide solution for separating ferrate salts from the aqueous hydroxide solution.

20 Claims, 9 Drawing Sheets

U.S. PATENT DOCUMENTS

| | | | |
|---|---|---|---|
| 4,435,256 A | 3/1984 | Deininger | |
| 4,435,257 A | 3/1984 | Deininger et al. | |
| 4,436,627 A | 3/1984 | McMonigle | |
| 4,451,338 A | 5/1984 | Deininger et al. | |
| 4,500,499 A | 2/1985 | Kaczur et al. | |
| 4,545,974 A | 10/1985 | Thompson | |
| 4,606,843 A | 8/1986 | Kaczur | |
| 4,711,667 A | 12/1987 | Bibber | |
| 4,985,152 A | 1/1991 | Hilbig et al. | |
| 5,069,763 A | 12/1991 | Hradcovsky | |
| 5,217,584 A | 6/1993 | Deininger | |
| 5,221,371 A | 6/1993 | Miller | |
| 5,298,092 A | 3/1994 | Schriever | |
| 5,551,994 A | 9/1996 | Schriever | |
| 5,685,993 A * | 11/1997 | Liu | 210/695 |
| 5,746,994 A | 5/1998 | Johnson | |
| 6,033,343 A | 3/2000 | Licht | |
| 6,253,924 B1 | 7/2001 | Bleifuss et al. | |
| 6,325,927 B1 | 12/2001 | Green | |
| 7,045,051 B2 * | 5/2006 | Minevski et al. | 205/543 |
| 2003/0159942 A1 | 8/2003 | Minevski et al. | |

FOREIGN PATENT DOCUMENTS

| | | |
|---|---|---|
| WO | WO 01/21856 A1 | 3/2001 |

OTHER PUBLICATIONS

Virender K. Sharma, Potassium ferrate (VI): an environmentally Friendly oxidant, Advances in Environmental Research 6 (2002) 143-156.

Virender K. Sharma, Iron (VI) and Iron (V) Oxidation of Thiocyanate, Environ. Sci. Technol. 2002, 36, 4182-4186.

Virender K. Sharma, Sequential One-electron Reduction of Fe (V) to Fe (UIII) by Cyanide in Alkaline Medium, The Journal of Physical Chemistry B, vol. 105, No. 46, pp. 11529-11532 Aug. 28, 2001.

Virender K. Sharma, Oxidation of Thioacteamide by Ferrate (VI) Marine Chemistry 70 (2000) 235-242.

Virender K. Sharma, Ferrate (VI) Oxidation of Thiourea, Environ. Sci. Technology 1999, 33, 2645-2650.

Virender K. Sharma, Heterogeneous Photocatalytic Reduction of Ferrate (VI) in UV-Irradiated Titania Suspensions, Langmuir The ACS Journal of Surfaces and Colloids, Reprinted from vol. 17, No. 15, pp. 4598-4601 (2001).

Virender K. Sharma, Ferrate (VI) Oxidation of Hydrogen Sulfide, Environ. Science Techn. 1997, 31, 2486-2491.

Virender K. Sharma, Resume Cover Sheet, undated.

Virender K. Sharma, Resume pp. 1-15, undated.

Stuart Licht, Direct electrochemical preparation of solid FE(VI) ferrate, and super-iron battery components, Electrochemistry Communications 4 (2002) 933-937.

Francois Lapicque, Direct electrochemical preparation of solid potassium ferrate, Electrochemistry Communications 4 (2002) 764-766.

International Search Report, Application No. PCT/IL 00/00588, International Filing Date Jun. 3, 2001, 2 sheets.

Database WPI Section Ch, Week, 199142 Derwent Publications Ltd., London GB; AN 1991-308274, XP002251512 & SU 1 604 863 A (Moscow Lomonosov Univ), Nov. 7, 1990 abstract.

Database WPI Section Ch, Week, 199105 Derwent Publications Ltd., London GB; AN 1991-035170, XP002251513 & SU 1 567 655 A (Moscow Lomonosov Univ), May 30, 1990 abstract.

K Bouzek: "Influence of anode material on current yields during ferrate (VI) production by anodic iron dissolution of grey cast iron to ferrate (VI) in concentrated alkali hydroxide solutions," Journal of Applied Electrochemistry, vol. 26, 1996, pp. 919-923, XP002251511 p. 920.

* cited by examiner

10 M NaOH

10 M KOH

5 M KOH / 10 M NaOH

ELECTROCHEMICAL METHOD AND APPARATUS FOR PRODUCING AND SEPARATING FERRATE(VI) COMPOUNDS

This is a divisional of U.S. application Ser. No. 10/084,020 filed Feb. 27, 2002, now issued as U.S. Pat. No. 6,946,078 B2.

This invention was made with government support under contract 68-D-01-027 awarded by the Environmental Protection agency (EPA). The government has certain rights in this invention.

BACKGROUND OF THE INVENTION

1. Field of the Invention

The present invention relates to electrochemical methods and apparatus for producing ferrate (VI) compounds.

2. Description of the Related Art

Interest in the practical use of ferrate compounds has increased in the last two decades, mainly because of the strong oxidizing properties of ferrates. Additionally, the use of ferrate, $FeO_4^{2-}$, promises a safe, convenient, and versatile alternative to current approaches for numerous industrial applications. One problem preventing the wide spread use for such processes is that ferrate is difficult to produce, particularly in commercial quantities, and current production methods produce a product typically containing residual impurities.

There are two basic methods for production of ferrate: chemical and electrochemical. Chemical methods contact an iron compound (i.e. iron (III) nitrate or iron (III) oxide) with an oxidizing material in either an alkaline environment (wet route) or under extreme temperatures in a controlled atmosphere (dry route). Electrochemical methods usually consist of a sacrificial iron anode placed in a proton exchange membrane (PEM) electrolyzer cell containing a strongly alkaline solution with an electrical current serving to oxidize the iron to Fe (VI).

Chemical production of ferrate typically uses a synthetic scheme involving a hypochlorite reaction. Most commonly, using alkaline oxidation of Fe (III), potassium ferrate ($K_2FeO_4$) is prepared via gaseous chlorine oxidation of ferric hydroxide in caustic soda, involving a hypochlorite intermediate. A number of difficulties are associated with the production of ferrate using this method. First, several requirements for reagent purity must be ensured for maximized ferrate yield and purity. However, even with these requirements satisfied, the purity of the potassium ferrate product still varies widely and depends upon many factors, such as reaction time, temperature, purity of reagents, and choice of isolation process. Ferrate prepared this way is typically 20% pure, with the major contaminants being alkali metal hydroxides, chlorides and ferric oxide. In addition, samples of this low purity product are unstable and readily decompose completely into ferric oxides.

Other chemical processes for preparation of ferrates are known and used, many of them also involving reactions with hypochlorite. Deininger discloses a chemical process for making stable, high-purity ferrate (VI) using beta-ferric oxide (beta-$Fe_2O_3$) and preferably monohydrated beta-ferric oxide (beta-$Fe_2O_3$—$H_2O$), where the unused product stream can be recycled to the ferrate reactor for production of additional ferrate.

Mills, et al. disclose a method of making ferrate, involving a reaction with hypochlorite, as well as a method of stabilizing the ferrate product so that it can be used as an oxidizing agent.

Evrard, et al. disclose the preparation of alkali or alkaline earth metal ferrates that are stable and industrially usable as oxidizers, and the use of these ferrates for water treatment by oxidation. This method, however, introduces an additional impurity as sulfate compounds are utilized to stabilize the resulting ferrate.

The most overwhelming disadvantage to these processes is the use of hypochlorite. Although the ferrate ion, $FeO_4^{2-}$, is an environmentally friendly oxidant itself, if the ferrate is produced by reaction with hypochlorite, its use will incur the deleterious side effects attributable to chlorine gas products.

Thompson discloses a method for direct preparation of iron and alkali metal or alkaline earth metal ferrates, where the iron in the product has a valence of +4 or +6. The method involves reacting iron oxide with an alkali metal oxide or peroxide in an oxygen free atmosphere or by reacting elemental iron with alkali metal peroxide in an oxygen free atmosphere. In addition, high temperatures are required (400°-700° C.) and an impure product is obtained.

Electrochemical oxidation of iron to ferrate (VI) has been given more attention in recent years. This method has the advantage of not using chemical oxidizers, such as hypochlorite, that add impurities to the ferrate product and have a negative environmental impact. FIG. 1 is an exploded view of a prior art electrochemical method using an ion-transfer membrane (such as perfluoronated sulfonic acid polymer membrane) that separates the anode and cathode chambers. The anode is sacrificial, usually consisting of tightly wound iron wire (either pure iron or carbon steel) and the cathode can be constructed of one of several materials, including porous carbon, nickel, or even carbon steel. A concentrated sodium hydroxide solution is pumped from a reservoir into the base of the anode chamber and collected from the top of the chamber. In a similar manner, a sodium hydroxide solution is passed through the cathode chamber. An electrical current is applied across the cell, causing the iron anode to oxidize to Fe(VI), which is soluble in sodium hydroxide and is carried off in the flowing anolyte.

In a series of patents, Deininger, et al. disclose an electrochemical method for ferrate production using a dual chamber cell, similar to that shown in FIG. 1, that is separated by a cation exchange membrane and a concentrated sodium hydroxide solution used for the anode and cathode solutions, with the anolyte also containing a sodium halide. The source of ferric ions can come from a ferric salt, iron scrap, or an iron anode. An electrical current is applied to the cell and the anolyte and catholyte solutions are flowed through the chambers. Optionally, the electrochemical cell may be operated with no flow of the hydroxide solutions.

Bouzek, et al. have also studied the electrochemical production of ferrate using an apparatus similar to Deininger's. In their process, Bouzek, et al. use a dual chamber cell with the anode and cathode chambers separated by a porous membrane and the cell is designed to operate with no flow of the electrolyte solutions. Various iron compounds and alloys were studied as well as the current density and temperature of reaction in order to determine the optimal conditions for ferrate production.

A primary disadvantage of these methods is that they also require several additional steps in order to obtain a solid ferrate salt. It is difficult to obtain solid ferrate salts because ferrate salts are soluble at greater concentrations in sodium hydroxide, even at low temperatures, than what is typically produced by either chemical or electrochemical processes. Most often, the solution of sodium ferrate is produced in sodium hydroxide and then, in a separate step, saturated with potassium hydroxide, resulting in a slurry of relatively insoluble potassium ferrate in a strongly alkaline solution. This slurry can be separated to obtain a raw ferrate/hydroxide sludge that can then be purified by one of several conventional methods. The remaining hydroxide contains too much KOH to be recycled for further ferrate production because the presence of KOH would cause precipitate fouling of the membrane and clogging of the anode chamber. As a consequence, the remaining mixed hydroxide solution must be discarded at very high disposal cost.

Finally, while these processes are operable for very small-scale production of ferrate, they present multiple difficulties for large-scale generation of Fe(VI) compounds. For example, during ferrate production some Fe(VI) degrades to Fe(III), which is insoluble in hydroxide solutions. The Fe(III) precipitates out of solution and coats the walls of the anode chamber as well as the separating membrane. As the membrane is coated, the current efficiency and production rate decrease until ferrate generation is less than ferrate decomposition. In order to prevent this, the production must be frequently stopped, the cell drained and cleaned with acid, and the cell refilled with either a fresh NaOH solution or by the previous ferrate/NaOH solution before production can be resumed. Additionally, the most efficient processes use expensive ion exchange membranes, which are unfeasible for industrial-scale processes.

Consequently, commercial supplies of ferrate are almost nonexistent. Despite the tremendous potential for ferrate in many industrial processes, the current production methods are insufficient and prohibitively expensive, making large-scale use of ferrate impractical.

Therefore there is a need for an improved method of producing ferrate (VI). It would be desirable if the method produced ferrate in a continuous process that lends itself to production of commercial quantities of ferrate. It would also be desirable if the method used inexpensive materials and made efficient use of solutions to minimize waste products.

SUMMARY OF THE INVENTION

The present invention provides a method for separating ferrate salts from a solution, comprising providing contact between the solution and a surface having a magnetic attraction, magnetically securing the ferrate salts to the surface, and eliminating contact between the solution and the surface. The step of providing contact may be selected from immersing the surface in the solution, passing the liquid ferrate mixture over the surface, and combinations thereof.

The solution may consist essentially of aqueous hydroxide and the ferrate salts. The solution may consist essentially of one or more aqueous hydroxides, one or more alcohols and a ferrate salt. The solution may consist essentially of aqueous hydroxide and the ferrate salts. The solution may consist of essentially of one or more aqueous hydroxides, one or more alcohols and a ferrate salt.

The magnetic attraction may be induced by one or more magnets selected from permanent magnets, electromagnets, and combinations thereof. The surface may be a nonmagnetic material covering the magnets. The surface may be constructed of the one or more permanent magnets, one or more electromagnets, or combinations thereof.

The step of eliminating contact comprises withdrawing the surface out of the solution with the ferrate salts secured to the surface. The surface may be the surface of a shape selected from a drum, a cylinder, a chain, a belt, a plate and a sphere. After withdrawing the surface out of the solution, the ferrate salts secured to the surface may be washed with alcohol. The alcohol may be selected from methanol, ethanol, isopropanol, and combinations thereof.

The solution may be contained within a reservoir, a tank, an electrochemical cell chamber, a pipe or a pool.

The step of providing contact includes passing the solution over the surface in a contact area by contact means selected from spraying, pumping, dumping, misting, or pouring. The step of eliminating contact includes moving the surface out of the contact area. The step of providing contact may further comprise moving the surface though an alcohol wash area and spraying an alcohol onto the ferrate particles secured to the surface. The alcohol may be selected from methanol, ethanol, isopropanol, and combinations thereof. The surface in the contact area may be selected from a plate, a belt, or a chain.

The ferrate salt may be removed from the surface. The ferrate salt may be removed from the surface, when the magnetic attraction is induced by electromagnets, by turning off the electromagnets. The ferrate may be removed from the surface by scraping the ferrate salts off the surface.

The method of the present invention may further comprise centrifuging the solution to obtain a concentrate solution having an increased ferrate salt concentration, removing the concentrate solution from the centrifuge, and mixing the concentrate solution with an alcohol before the step of providing contact between the solution and the surface. The alcohol may be selected from methanol, ethanol, isopropanol, and combinations thereof.

The present invention also provides an apparatus for electrochemical production of a ferrate salt, comprising an electrochemical cell having an iron-containing anode, cathode, and an aqueous hydroxide solution in fluid communication with both the anode and the cathode, and a magnetic separator in fluid communication with the aqueous hydroxide solution for separating ferrate salts from the aqueous hydroxide solution.

The aqueous hydroxide solution may comprise a hydroxide selected from sodium hydroxide, potassium hydroxide, lithium hydroxide, cesium hydroxide, barium hydroxides, and combinations thereof. The aqueous hydroxide solution may comprise a hydroxide selected from alkali earth metal hydroxides, alkaline earth metal hydroxides and combinations thereof. The aqueous hydroxide solution has a hydroxide concentration between about 1 molar and about 30 molar, preferably between about 5 molar and 20 molar, and most preferably between about 10 molar and about 20 molar.

The aqueous hydroxide solution may be a mixture of sodium hydroxide and potassium hydroxide. The molar ratio of potassium hydroxide to sodium hydroxide may be up to about 5, preferably between about 1 and about 3. The aqueous hydroxide solution may comprise between about 5 molar and about 15 molar NaOH and between about 5 molar and about 15 molar KOH.

The anode may have an iron content of between 90% and 100%, preferably greater than 99%. The anode may be made of material selected from iron, cast irons, malleable iron, ductile iron, carbon steels, stainless steels and combinations thereof. The anode has a configuration selected from expanded metal mesh, wire mesh, woven metal cloth, flat plate, rod and combinations thereof.

The cathode may be made of material selected from iron, iron alloys, nickel, nickel alloys, or carbon. The cathode may be made of material selected from iron, cast irons, malleable iron, ductile iron, carbon steels, stainless steels and combinations thereof. Furthermore, the cathode may be made of material selected from nickel, nickel-molybdenum alloys, nickel-vanadium alloys and combinations thereof. The cathode may have a configuration selected from expanded metal mesh, wire mesh, woven metal cloth, flat plate, rod and combinations thereof.

The anode may be shaped in a form selected from arcuate or cylindrical, and may be positioned along an axis of the anode. Optionally, a porous frit may be placed between the cathode and anode.

BRIEF DESCRIPTION OF THE DRAWINGS

So that the above recited features and advantages of the present invention can be understood in detail, a more particular description of the invention, briefly summarized above, may be had by reference to the embodiments thereof which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

The present invention provides a method and apparatus for the electrochemical production of potassium ferrate. The method uses a single chamber electrochemical cell with an aqueous electrolyte solution comprising one or more hydroxide components. While the same cell can be operated using a single hydroxide, particularly either sodium or potassium hydroxide, dramatically increased yields are obtained from using a mixture of sodium hydroxide and potassium hydroxide. In particular, it is preferred that both sodium hydroxide and potassium hydroxide be present in concentrations greater than 5 molar, most preferably at least 10 molar, i.e., 10 M NaOH and 10 M KOH. The anode is preferably a sacrificial anode made out of an iron-containing material to supply the iron necessary for the ferrate production reaction. The cathode may be made out of various materials, such as nickel, iron, carbon or combinations thereof.

One advantage of this process is that no ionically conducting membrane is required, thereby decreasing fouling inside of the cell and increasing the length of time that ferrate production may continue between cell cleanings. This advantage results in decreased downtimes and increased production capabilities. Furthermore, precipitation of ferrate within the same single-chamber cell as the ferrate is generated does not create the fouling problem caused by the precipitation in a cell having a membrane. There is no requirement for any type of separator to isolate the anode from the cathode.

Another advantage of the present method is that the mixed potassium hydroxide (KOH) and sodium hydroxide (NaOH) electrolyte may be recycled and reused after the extraction of the ferrate salt precipitate because the mixed KOH/NaOH electrolyte can be used in the production process within the electrochemical cell. Recycling the hydroxides reduces chemical costs as well as disposal fees for waste hydroxide solutions produced in the traditional electrochemical cells. Furthermore, any unrecovered ferrate remaining in the solution is not discarded, but retained in the recycled solution. Finally, it is not necessary in the process of the present invention to add chemicals to the electrolyte to increase ferrate stability in solution since the conditions cause the formation of stable potassium ferrate particles. This eliminates a further source of impurities in the ferrate product and also reduces chemical costs.

The production of ferrate in the present invention is by electrochemical reaction within an electrochemical cell, either a single cell or multiple cells placed in series and/or parallel operation. The cell has an anode, a cathode and a chamber within which the anode and cathode are housed. The chamber also holds the aqueous hydroxide solution electrolyte. A power source connected to the cell provides the current required for the electrochemical reaction to proceed.

Figure 1:
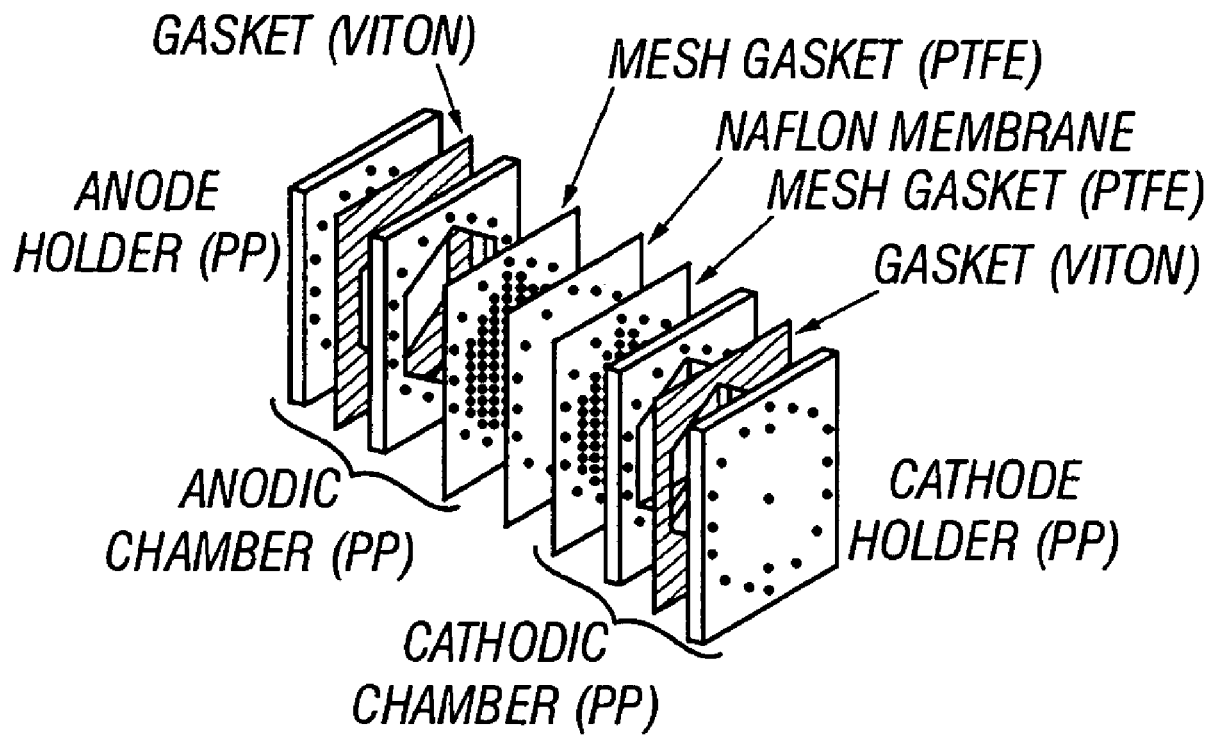
FIG. 1 is an exploded view of a prior art electrochemical method using an ion-transfer membrane that separates the anode and cathode chambers.
Figures 2A, 2B:
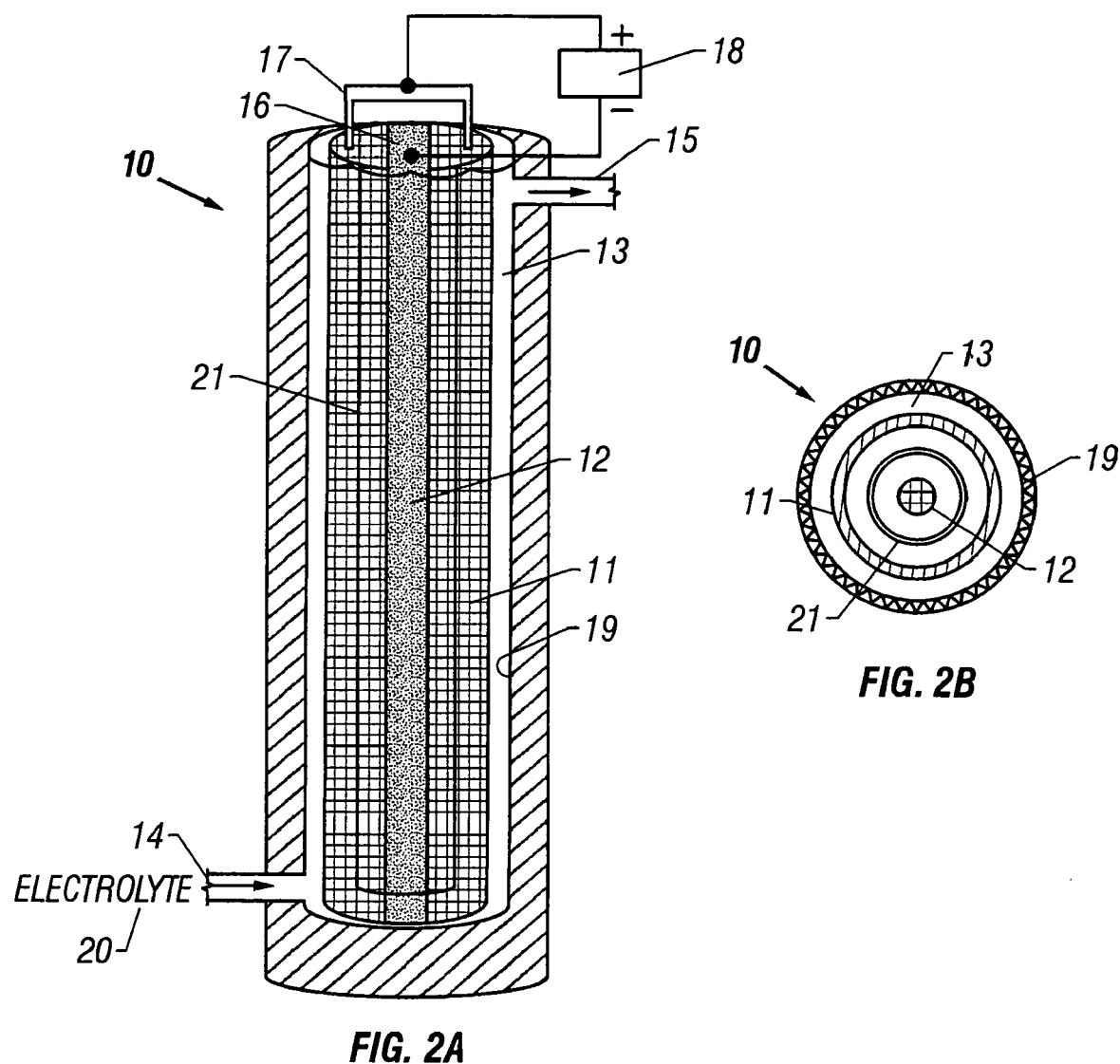
FIGS. 2A-2B illustrate an exemplary electrochemical cell for production of potassium ferrate through electrochemical oxidation of iron to Fe (VI).

FIGS. 2A and 2B illustrate an exemplary electrochemical cell 10 for production of potassium ferrate through electrochemical oxidation of iron to Fe (VI). The anode 11 and cathode 12 of the electrochemical cell 10 are housed within a single chamber 13 suitable for containing an electrolyte solution 20. The electrochemical cell 10 configuration may vary, for example by including parallel planar electrodes, but the cell preferably has an arcuate or cylindrical anode 11 and a cathode 12 positioned along the axis of the arc or cylinder. It is a critical aspect of the invention that the electrochemical cell does not use an ionically conducting membrane pressed between the anode and cathode. Furthermore, the process does not require separate anolyte and catholyte solutions. Optionally, a porous frit 21 may be placed between the anode and the cathode electrodes.

The anode 11 preferably is an iron-containing material, preferably over 90% iron and more preferably over 99% iron. For example, 1008 carbon steel, a highly preferred material for the anode, contains iron with less than 0.1% carbon, 0.5% manganese, 0.04% phosphorous and 0.05% sulfur. The anode may also be constructed of materials selected from iron, cast irons, malleable iron, ductile iron, carbon steels, stainless steels or combinations thereof. To increase the surface area of the anode, it is preferable that the anode be configured as, for example, metal mesh, wire mesh, woven metal cloth or combinations thereof. Alternatively, other configurations may be used, such as flat plates, rods, or combinations thereof.

Alternatively, the anode may be of a non-iron-containing or low concentration iron-containing electrically conductive material such as nickel, nickel alloys, carbon, or other materials known to those having ordinary skill in the art. In this alternative, an alternate or supplemental source of iron must be supplied, such as, for example, iron chips, scrap iron, pieces of iron-containing material or combinations thereof immersed in the electrolyte in the cell and/or iron salts contained in solution with the electrolyte.

The cathode 12 material can comprise pure iron, iron alloys, nickel, nickel alloys, carbon, or other electrically conducting material known to those having ordinary skill in the art. While the cathode may be provided in various configurations, such as wire mesh, metal mesh, woven metal cloth or combinations thereof, it is preferably configured as a bar or flat plate.

All wetted materials, such as the chamber wall 19 in the electrochemical cell, with the exception of the anode and the cathode, should be constructed from, or coated with, materials that are chemically inert in a strong hydroxide environment and a strong oxidant environment. Preferably, plastics such as polypropylene or polytetrafluoroethylene (PTFE) are used as construction materials for the chamber, tubing and the like, though other suitable materials may be used.

Any aqueous hydroxide solution may be used as the electrolyte 20, but the preferred hydroxide is selected from sodium hydroxide, potassium hydroxide, lithium hydroxide, cesium hydroxide, barium hydroxides, other alkali earth metal hydroxides, other alkaline earth metal hydroxides, and combinations thereof. More preferably, the electrolyte comprises a mixture of two or more hydroxides, most preferably a mixture comprising sodium and potassium hydroxide. No other components (such as sodium halides or sulfates) are necessary within the electrolyte solution. The concentration of the aqueous hydroxide solution should be between about 1 molar and about 30 molar, preferably between about 5 molar and about 20 molar, and most preferably between about 10 molar and about 20 molar. For example, a 20 M aqueous hydroxide solution may be 20 M NaOH or 10 M NaOH and 10 M KOH. When a mixture of NaOH and KOH is used, the molar ratio of KOH to NaOH should be up to about 5, preferably between about 1 and about 3 molar ratio. An aqueous mixture of NaOH and KOH may be about 5 M NaOH and 5 M KOH up to about 15 M NaOH and about 15 M KOH.

The electrolyte 20 enters the chamber 13 through the inlet nozzle 14 and exits through the outlet nozzle 15. The inlet nozzle 14 and the outlet nozzle 15 are on opposite ends of the chamber 13. Alternatively, the nozzles could be located at the same end of the chamber or at the top and/or bottom of the chamber. As a further alternative, if the cell 10 were operated in batch mode, only one nozzle would be required to serve as both the fill nozzle and the drain nozzle.

Current is applied to the cell 10 from a power source 18 so that the current density at the anode 11 is between about 1 and 100 milliamps per square centimeter of anode surface. The power source is connected to the anode power connection 17 and the cathode power connection 16. Preferably, the current density at the anode should be between about 1 and 50 mA/cm$^2$ and most preferably between about 20 and 40 mA/cm$^2$. The applied current may be direct (DC), sinusoidal (AC), or a combination of AC superimposed on a DC carrier. The AC component can be used to enhance performance as well as to clean by-products off the surface of the electrodes. The temperature of the electrolyte during ferrate production is preferably maintained between about 10° C. and about 80° C.

The cell 10 may be run in a number of flow modes. The cell may be operated in a batch mode by filling the cell with electrolyte, applying a current for a set period of time and then draining the resulting electrolyte/ferrate mixture. It may also be run in a continuous flow mode, with electrolyte containing little or no ferrate either flowing through a single cell or flowing through a series of electrolytic cells. Finally, the cell may be operated in a semi-batch mode, where electrolyte is recirculated through the cell, or through a series of cells, from a reservoir of fixed volume, building and then maintaining a concentration of ferrate in the circulating electrolyte. Other embodiments of carrying out the ferrate production of the present invention will become apparent in light of the present disclosure and are considered to be included within the scope of the invention.

Optionally, the process may include one or more steps for cleaning part or all of the electrochemical cell, especially removing Fe (III) compounds that deposit on the walls and other surfaces within the cell during operation. After rinsing the cell with water to remove all traces of hydroxides, the process preferably includes periodically dissolving Fe (III) compounds from the walls and electrode surfaces within the cell using a dilute acid, such as hydrochloric acid or sulfuric acid. After sufficient contact time with the cell, preferably about 5 minutes, the acid is drained from the cell and the cell is flushed with deionized water. The cell can then be put back into ferrate production by providing the cell with a fresh or recycled hydroxide solution.

Figure 3:
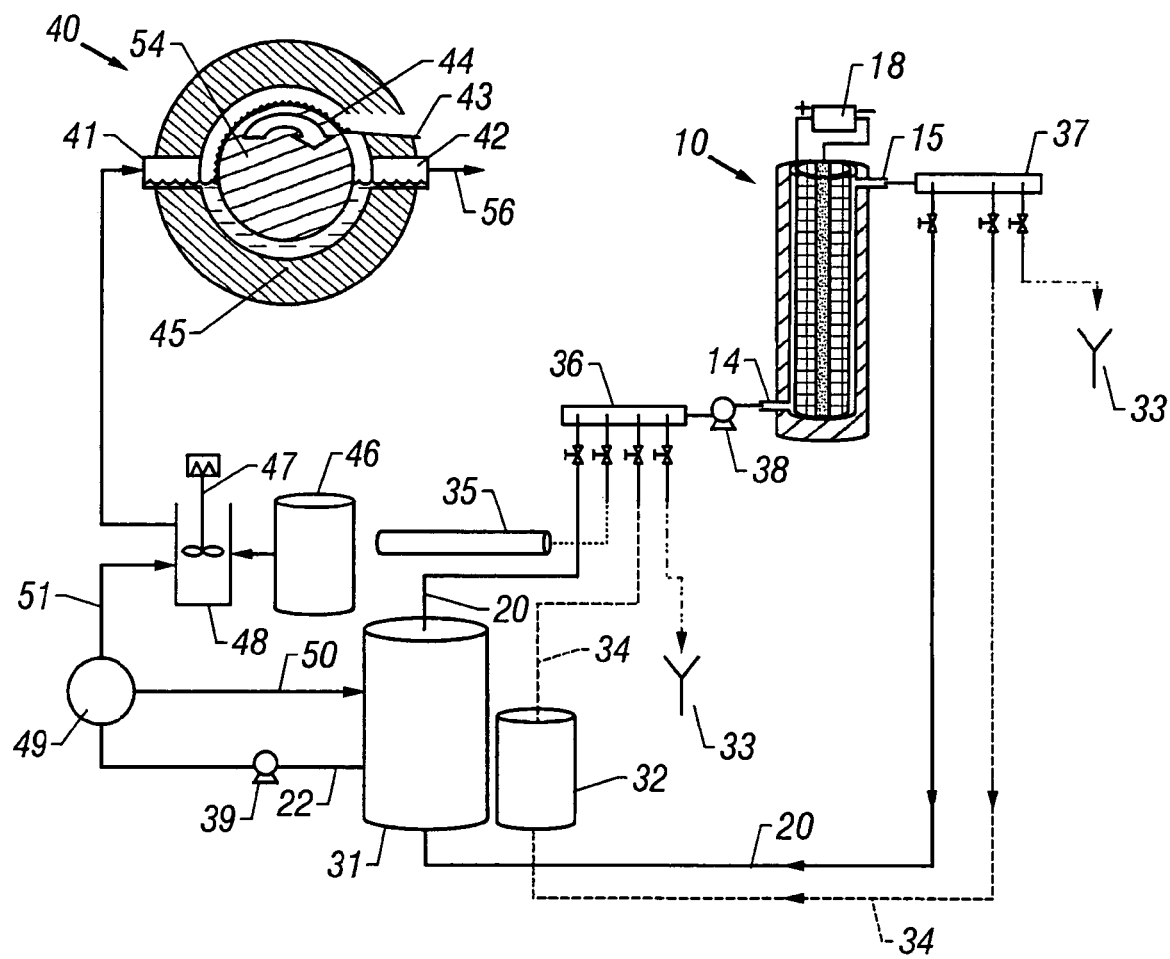
FIG. 3 is a flow diagram of a preferred ferrate production system using the electrochemical cell of FIG. 2A.

FIG. 3 is a flow diagram of an exemplary ferrate production system using the electrochemical cell of FIG. 2 in a semi-batch flow mode. The system provides selective fluid communication of the electrochemical cell with three significantly different liquids that will, during respective steps or processes, flow into and/or through the electrochemical cell. The different liquids are directed into and out of the cell 10 through an inlet manifold 36 and an outlet manifold 37. Alternatively, any piping, tubing, or other means would be acceptable for directing the different liquids into and out of the cell 10.

The first liquid is the electrolyte/ferrate mixture 20, which is circulated with the pump 38 from an electrolyte/ferrate storage tank 31, through the cell 10, and back to the storage tank 31. Preferably, an AC current superimposed on a DC carrier is supplied by the power source 18 to simultaneously promote ferrate generation and cell cleaning. The electrolyte contains a mixture of sodium hydroxide and potassium hydroxide as disclosed above. The ferrate precipitate formed in the cell 10 is carried along in the electrolyte as an electrolyte/ferrate mixture 20 until the ferrate is recovered as a ferrate product.

Periodically it is necessary to shut the cell down, drain the electrolyte/ferrate mixture from the cell, and clean deposits from the cell. Therefore, a dilute liquid acid 34, such as hydrochloric or sulfuric acid, is circulated through the cell 10 in order to clean the cell by dissolving any Fe (III) compounds coating the walls of the cell, the anode, and the cathode. The pump 38 circulates the acid from an acid storage tank 32, through the cell 10, and then back to the acid storage tank 32. Alternatively, the acid cleaning could be accomplished by a batch process whereby the cell chamber 13 is filled with acid, the acid is allowed to stay in the cell for a set period of time, and then the acid is returned to the acid tank 32 or drained to a sewer 33 for disposal.

A water source 35, the third liquid, is necessary for flushing the cell 10 before and after the acid cleaning step. Preferably, the water is deionized water. The water 35 may be pumped through the cell with the pump 38 or otherwise pressured into the cell 10. The water is flushed to a sewer 33 before and after the acid cleaning to prevent acid/base reactions and to prevent the addition of impurities (such as sodium or potassium salts) to the ferrate solution.

During production, as the ferrate concentration builds in the circulating electrolyte/ferrate mixture 20, the mixture may be drawn off and packaged as a concentrated ferrate mixture or alternatively, the ferrate may be removed from the mixture and packaged as a solid ferrate product. One method of recovering solid ferrate from the circulating mixture is to circulate a sidestream of the mixture from the electrolyte/ferrate storage tank 31 through a centrifuge 49, then to wash the concentrated ferrate removed from the centrifuge in a methanol wash 48, and then to magnetically recover the solid ferrate product in a magnetic drum separator 40.

A preferred full production cycle comprises three steps. First, the cell 10 is filled with electrolyte, preferably the 10 M NaOH/10 M KOH mixture as disclosed above. The hydroxide solution is either held stagnant in or circulated through the cell. Second, a controlled current is applied from the power source 18, inducing ferrate generation in the hydroxide electrolyte. After a set ferrate concentration in the electrolyte/ferrate mixture 20 is reached, the current is terminated. Third, in a batch process, the electrolyte/ferrate mixture is drained from the cell and packed as a ferrate/electrolyte mixture product or further processed to extract the solid ferrate from the solution by filtration, centrifugation and/or magnetic means. The cell may then be refilled, either with fresh or recycled electrolyte, to continue ferrate production. In a continuous process and in a semi-batch process, some of the circulating electrolyte/ferrate mixture 20 may be withdrawn for further processing to remove the ferrate product. If the electrolyte/ferrate mixture is packaged as a final product, then fresh hydroxide solution is added to the storage tank 31. If ferrate is removed from the electrolyte/ferrate mixture 20, then the electrolyte may be recycled back to the storage tank 31 after the ferrate recovery step.

Optionally, if an acid cleaning cycle is needed, a fourth step flushes the cell with deionized water 35 to remove all traces of hydroxides. Fifth, a weak solution of an acid 34, such as hydrochloric or sulfuric, is circulated from an acid storage tank 32 through the cell 10 to dissolve any Fe (III) deposits. Alternatively, cleaning the cell may be accomplished in a batch process by filling the cell chamber with acid and allowing the acid to remain in the cell for a set period of time before draining the acid to an acid storage tank or a sewer. After circulating the acid for about five minutes, the acid 34 is drained from the cell, either to the sewer 33 or the acid storage tank 32. After the acid cleaning step, whether with a circulating acid process or a batch process, the cell is again flushed with deionized water 35 as the sixth step. Finally, the cell is refilled with fresh or recycled electrolyte and a new production cycle may begin.

Recovery of the ferrate from the electrolyte/ferrate mixture may be achieved by filtration, centrifugation, or by magnetic means with or without a filtration or centrifugation step. The liquid remaining after the removal of the ferrate is preferably recycled to be used again as the electrolyte for the electrochemical cell. The mixture may be chilled to help separate the ferrate.

The ferrate particles are quite small in the liquid ferrate mixture and are suspended in the liquid electrolyte. Any means of charging the ferrate separation equipment is acceptable. For example, in a continuous process, a slipstream of the circulating electrolyte having suspended ferrate particles could be charged to the separation equipment. In a batch process, the cell may be drained of the liquid ferrate mixture directly to the separation equipment or to a holding tank for later separation. In a semi-batch system, a separate stream from an electrolyte circulation tank may be charged to the separation equipment.

The separation process may be a batch operation or a continuous operation. In a batch operation, a quantity of liquid ferrate mixture is charged to the separation equipment, the separation equipment is then activated to separate the ferrate from the liquid, the liquid is then drawn off and the solid ferrate recovered and then another batch of liquid ferrate mixture is charged to the separation equipment. In a continuous process, a stream of ferrate liquid mixture is continuously fed to the separation equipment, the solids continuously recovered and the liquid continuously drawn off and recycled for further use.

Any type of filtration equipment or centrifugation equipment suitable for recovering the ferrate from the liquid would be adequate. The preferred equipment, however, is recovery by magnetic means. A magnetic surface may be placed in contact with the liquid mixture. Because the ferrate is attracted to the magnetic surface, the ferrate may be recovered from the liquid by magnetic means.

The surface itself does not have to be magnetic, but only act magnetic. The source of magnetism, one or more permanent magnets, electromagnets, or combinations thereof, may be below the surface being contacted with the liquid ferrate mixture, so long as the surface acts magnetic by allowing the magnetic forces to pass through the surface, thereby allowing the ferrate particles to be attracted to the surface. The surface may act as a covering or layer over the magnets, which may provide corrosion protection, or the surface may move over the magnets, as for example, when the surface is a moving belt and the magnets are a plate, plates or rollers supporting the moving belt. Of course, the surface may itself be one or more permanent magnets, electromagnets, or combinations thereof.

The surface may contact the liquid ferrate mixture by being immersed in the mixture, or by having the mixture sprayed or pumped over the surface. The contact must be gentle enough to allow the particles to adhere to the surface and not wash away. The surface may move through a contact area, for example, by immersing part of a surface by rotating the surface through a reservoir of the liquid ferrate mixture or by moving the surface under a spray header or other pumping contact means. Alternatively, as in a batch process, the surface may remain stationary and the liquid ferrate mixture removed by draining or by stopping the spray or pump, thereby exposing the ferrate on the surface to be removed from the surface.

The ferrate may be removed from the surface by a scraper that scrapes the ferrate from the surface. If the surface is moving, the surface may move past a scraper blade that removes the ferrate after the surface has moved past the liquid ferrate mixture. If the surface is not moving, then the scraper may pass over the surface after the ferrate liquid has been removed and the surface is available for scraping. Alternatively, if electromagnets are used, then the power to the electromagnets may be turned off in the region of the surface ready for ferrate removal, thereby releasing the ferrate particles and reducing or eliminating the need for a scraper blade.

The ferrate particles may be washed with an alcohol before they are removed from the surface. The surface may be immersed in an alcohol bath or alcohol may be sprayed on the particles before the particles are removed from the surface. Any means of contacting the particles adhering to the surface is suitable as long as the contact is gentle enough not to wash the particles from the surface. The alcohol may be recovered for reuse or may be discarded. Any alcohol may be used, such as methanol, ethanol or isopropanol. Alternatively, if a centrifuge is used prior to the magnetic removal of ferrate, then the alcohol wash may be before and/or after the magnetic removal step.

FIG. 3 further shows an exemplary system that may be used to recover the ferrate using a centrifuge and a magnetic drum. A slipstream of electrolyte containing ferrate 22 is charged to a centrifuge 49. The centrifuge concentrates the ferrate in the centrifuge outlet stream 51 leaving the centrifuge. The rejected electrolyte 50 is returned from the centrifuge 49 to the electrolyte/ferrate storage tank 31.

The ferrate centrifuge outlet stream 51 from the centrifuge is charged to a methanol wash vessel 48 where the ferrate is washed with methanol from a methanol storage tank 46. Optionally, a mixer 47 facilitates washing the ferrate in the methanol wash vessel 48. Other alcohols may be used as an alcohol wash including, for example, ethanol, isopropanol, or combinations of alcohols. It should be noted that the ferrate should not remain in contact with the methanol for more than 60 seconds, preferably less than 30 seconds, to minimize the oxidation of the methanol by the ferrate. The ferrate may be washed with acetone to remove the alcohol.

The ferrates with the methanol wash solution are charged to a magnetic drum separator 40. The washed ferrates enter the separator through an inlet 41 and a level is maintained by the position of the overflow outlet nozzle 42. A magnetic drum 54 rotates through the ferrate/alcohol mixture 45 while particles of ferrate are attracted to the magnetic drum 54. As the drum rotates, a scraper 43 removes the ferrate particles.

The liquid 56 flowing from the outlet 42 may be disposed of, further processed to separate the methanol and hydroxides so the methanol and hydroxides may be recycled, or it may flow to a second magnetic separator for further recovery of ferrate from the liquid. Several magnetic separators 40 may thus be placed in series for maximum recovery of the ferrate product.

Figure 4:
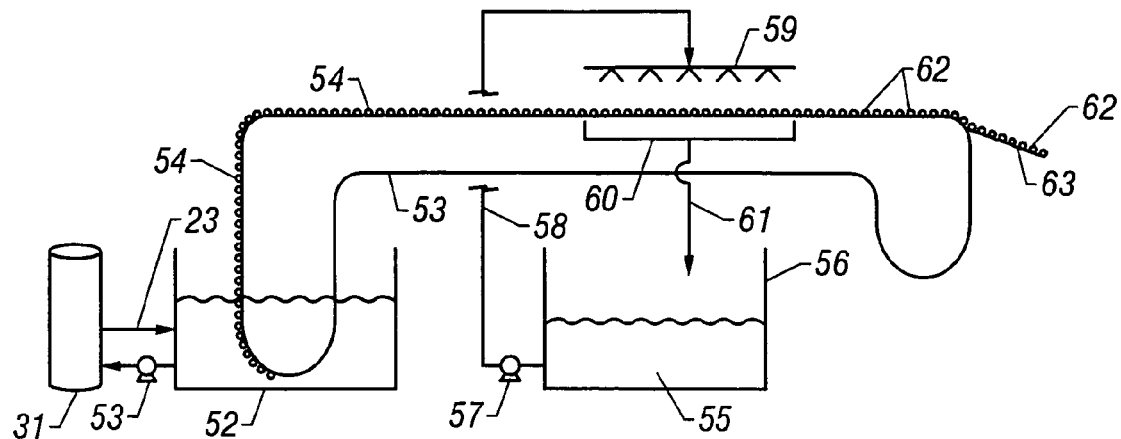
FIG. 4 illustrates an exemplary system for the magnetic recovery of ferrate from an electrolyte/ferrate mixture.

FIG. 4 shows an exemplary system used for recovering the ferrate using a magnetic means without a centrifugation step. In this system, a magnetic belt 53 is passed through a ferrate recovery vessel 52 containing the electrolyte/ferrate mixture 23. A pump 53 circulates the mixture 23 between the ferrate recovery vessel 52 and the electrolyte/ferrate storage tank 31. The electrolyte/ferrate mixture 23 may circulate continuously between the storage tank 31 and the ferrate recovery vessel 52. Optionally, the ferrate recovery vessel 52 may be filled with the electrolyte/ferrate mixture from the storage tank 31 and the mixture not returned to the storage tank until all, or a pre-determined amount of the ferrate, has been removed.

Alternatively, the belt may pass through the cell 10 or through the electrolyte/ferrate tank 31 or through any space that allows the belt to become immersed or otherwise contacted with the electrolyte/ferrate precipitate mixture, including pumping or spraying the mixture over the belt 53. As the belt 53 is contacted with the mixture 23, particles of ferrate 54 are magnetically attached to the belt 53.

After the belt passes out of the vessel 52, the ferrate particles 54 are sprayed with an alcohol. The alcohol is passed by a pump 57 through a spray header 59 that generates a gentle wash so that the ferrate particles 54 are not washed off the belt 53. Any means of washing the ferrate particles 54 is acceptable, including immersing the belt with the attached ferrate into an alcohol bath, so long as the means are gentle enough so as not to wash the particles 54 off the belt 53. A catch pan 60 catches the alcohol draining from the belt 53 and returns the alcohol through a return pipe 61 back to the methanol reservoir 55. Alternatively, any means for draining the alcohol from the belt is acceptable. The alcohol-washed ferrate particles 62 are then scraped off the belt 53 with a scraper 63. Alternatively, if the belt is made of electromagnets, or electromagnets are used as the attractive force, then the electromagnets could be turned off in the region of the belt after the alcohol wash thereby releasing the ferrate particles and reducing or eliminating the need for a scraper 63 to scrape the particles off the belt.

The belt may be made of non-magnetic materials moving over a magnetic surface, such as rollers, plates or combinations thereof, wherein the magnetic forces from the rollers or plates pass through the belt to attract and hold the ferrate particles. Alternatively, the belt itself may be made of magnets passing over non-magnetic rollers or other surfaces for needed support. Any or all of the magnets may be permanent magnets or electromagnets.

Figure 5:
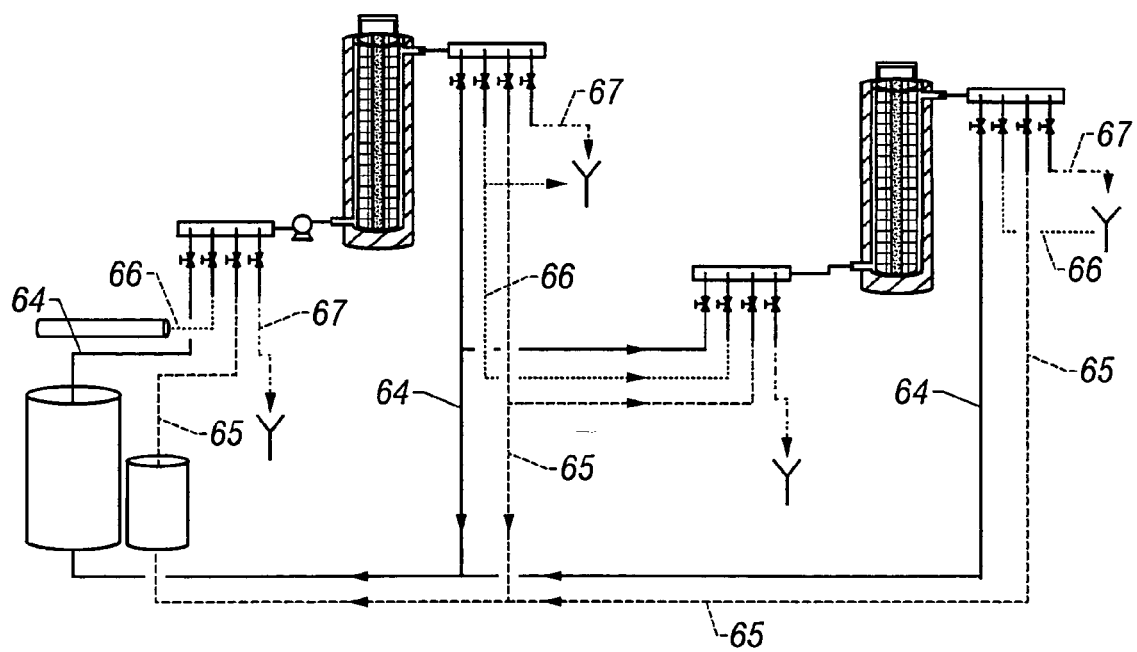
FIG. 5 illustrates multiple cells connected in series.

The disclosed process can be operated at a small-scale production level, using only one cell of a desired size, or scaled-up to an industrial-scale process where many cells are utilized to produce large quantities of ferrate. Multiple cells can be set to either run independent of the other cells or to operate in series, where the output of one cell is the feed-line to the next cell in the series. FIG. 5 shows how multiple cells may be set up to run in series showing two cells 10 with the electrolyte/ferrate lines 64, the acid lines 65, the deionized water lines 66 and the sewer/waste lines 69.

EXAMPLE 1

This example is of the production of ferrate (VI) using a pure NaOH electrolyte. Except where indicated, the following conditions apply to all the examples. The anode and cathode materials used in the following examples were a mesh of 1008 carbon steel (containing iron and less than 0.1% carbon, 0.5% manganese, 0.04% phosphorous, 0.05% sulfur) having a surface area of approximately 5.7 $cm^2/g$. The anode was a flat sheet 15 cm wide×25 cm high wrapped to form a cylindrical shell 25 cm high and 5 cm in diameter with a mass of 236 grams. The cathode consisted of a strip of mesh 25 cm high and 1.3 cm wide. One liter of an electrolyte solution was circulated for 120 minutes through a cylindrical cell, as shown in FIG. 2, having an internal volume of approximately 800 ml. A 40 amp current was applied to the cell, giving a current density at the anode of 30 $mA/cm^2$. Ferrate concentration in solution was determined by UV/VIS spectroscopy at 505 nm (at this wavelength, the ferrate extinction coefficient is 1070 $M^{-1}$ $cm^{-1}$)

Figure 6A:
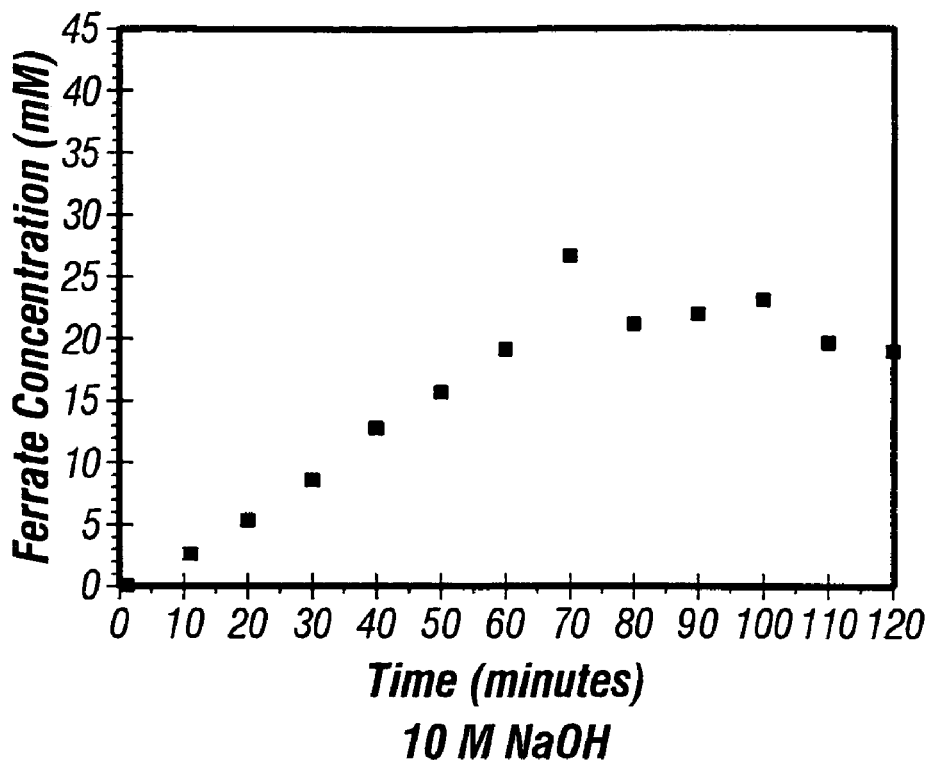
FIGS. 6A-6G are graphs of the ferrate concentration over time for seven different hydroxide solutions.

A solution of 10 M NaOH was used as electrolyte in the cell. FIG. 6A is a graph of the ferrate concentration over time, showing that a maximum ferrate concentration of about 21 millimolar was reached after 60 minutes. After 60 minutes, the ferrate concentration leveled off and fluctuated between 19 and 23 millimolar despite continued application of current. The average ferrate production rate was 0.18 mM/min.

EXAMPLE 2

Figure 6B:
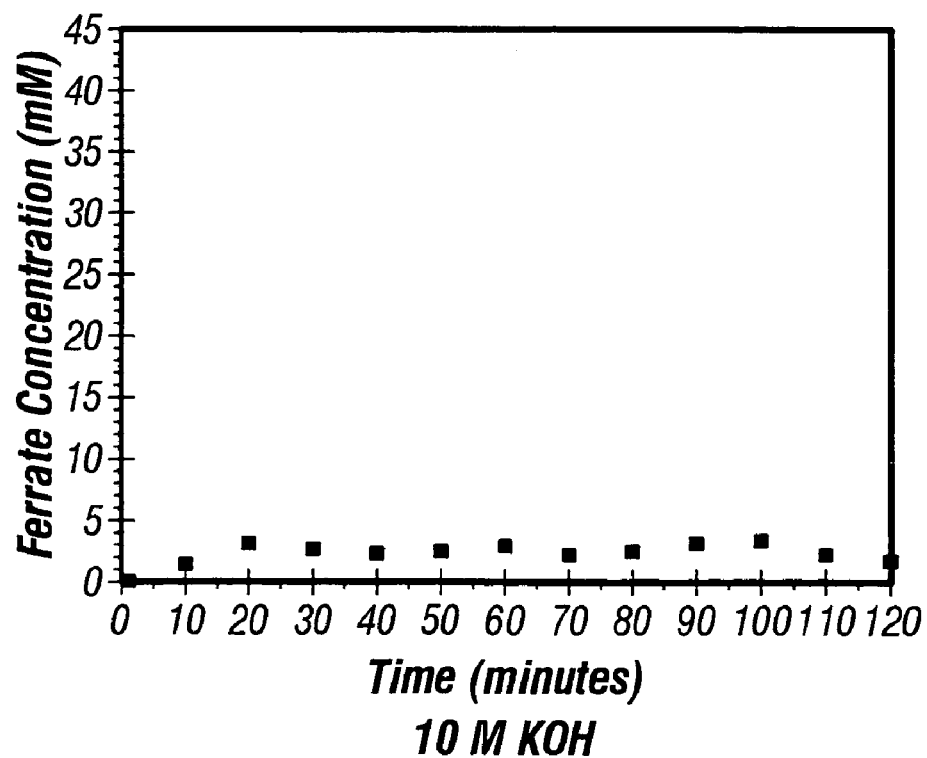

This example is of the production of ferrate (VI) using a pure KOH electrolyte. A solution of 10 M KOH was used as electrolyte in an identical cell to that of Example 1. FIG. 6B is a graph of the ferrate concentration over time, showing that a maximum ferrate concentration of about 4 millimolar was reached after 20 minutes. After this time, the ferrate concentration leveled off and fluctuated between 3 and 4 millimolar. The average ferrate production rate was 0.03 mM/min.

EXAMPLE 3

Figure 6C:
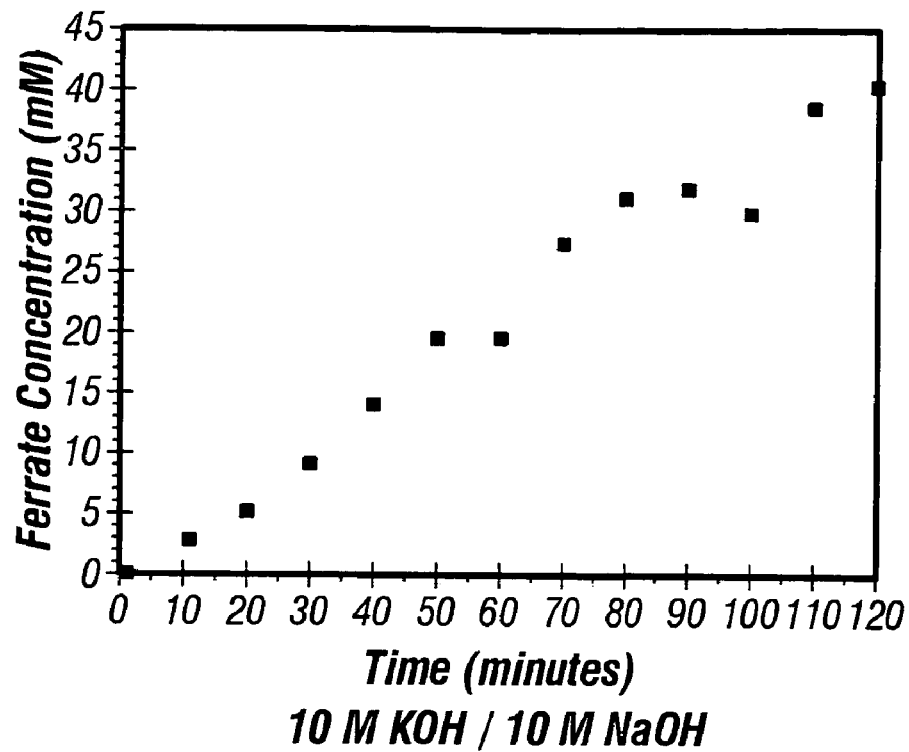
Figure 6D:
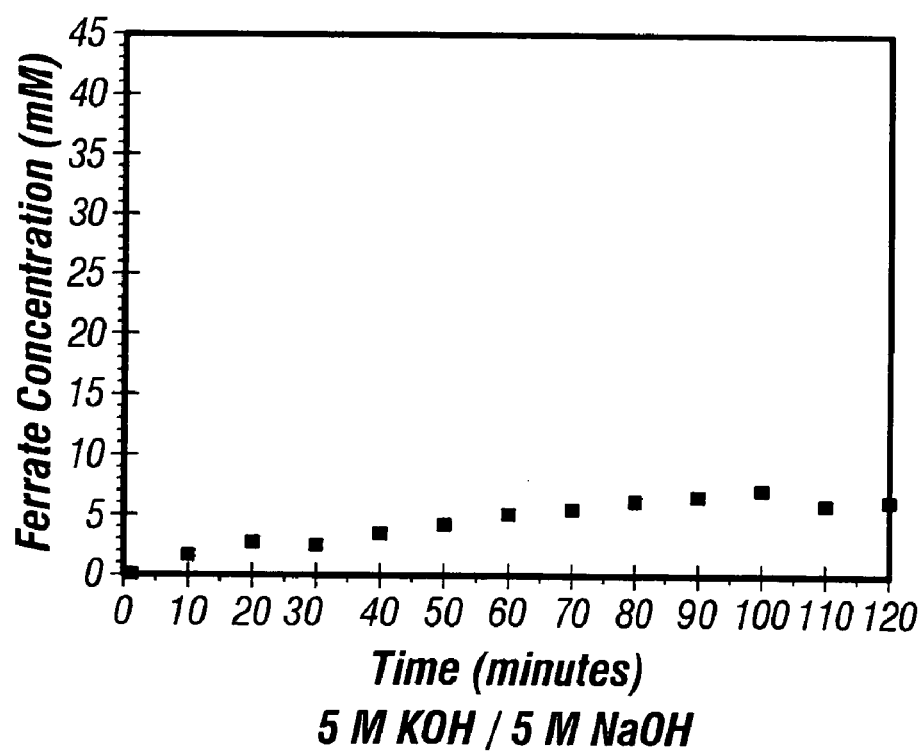
Figure 6E:
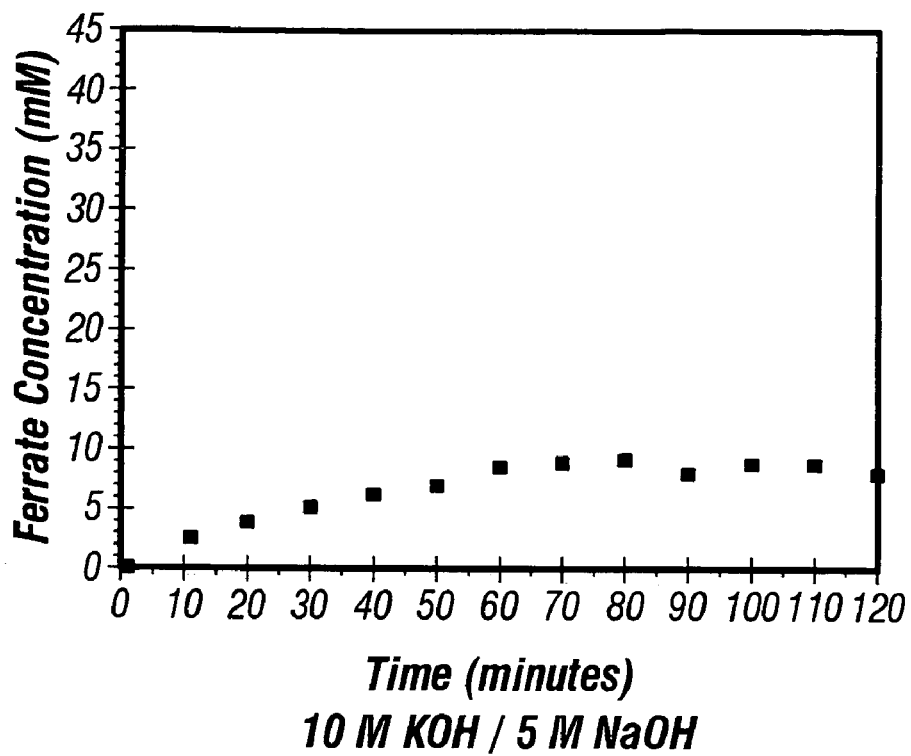
Figure 6F:
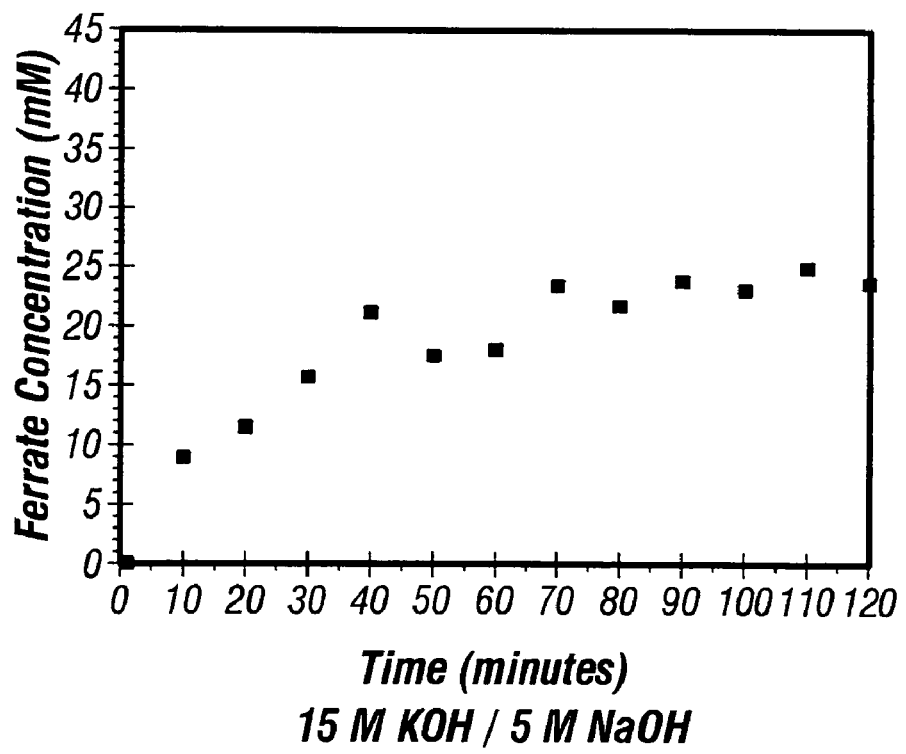
Figure 6G:
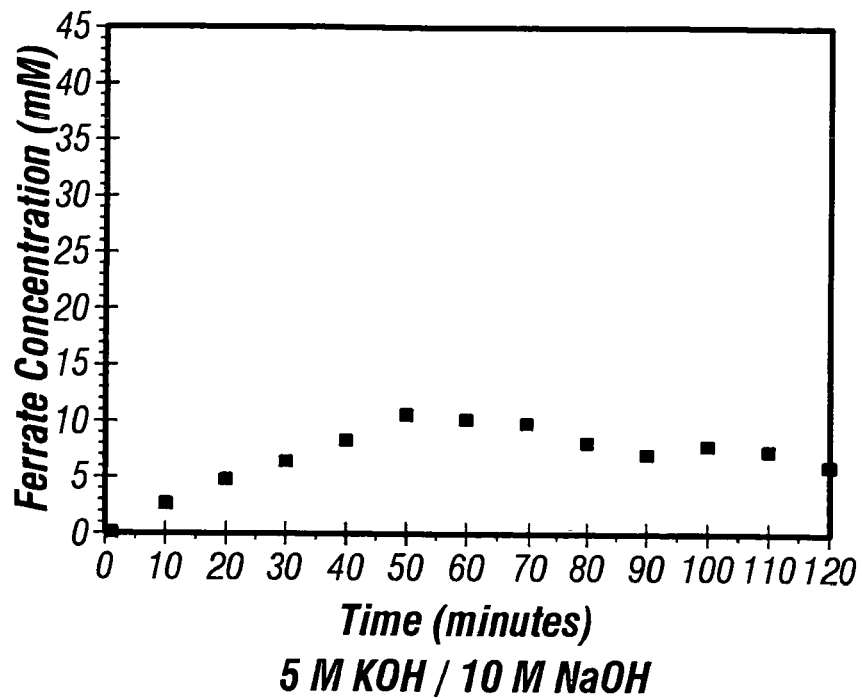

This example is of the production of ferrate (VI) using various mixtures of KOH and NaOH as the electrolyte. Mixtures of KOH and NaOH at various concentrations and ratios were used as the electrolyte solutions in identical cells to that of Example 1. FIGS. 6D through 6G are graphs of the ferrate concentration over time for four different hydroxide solutions. The hydroxide solutions were: FIG. 6D, 5 M KOH/5 M NaOH; FIG. 6E, 10 M KOH/5 M NaOH; FIG. 6F, 15 M KOH/5 M NaOH; FIG. 6G, 5 M KOH/10 M NaOH. The average ferrate production rates corresponding to the hydroxide concentrations shown in each of the figures were: FIG. 6D, 0.05 mM/min.; FIG. 6E, 0.07 mM/min.; FIG. 6F, 0.19 mM/min.; FIG. 6G, 0.08 mM/min.

EXAMPLE 4

This example is of the production of ferrate (VI) using a mixture of 10 M KOH/10 M NaOH as the electrolyte. A solution of 10 M KOH/10 M NaOH was used as electrolyte in an identical cell to that of Example 1. FIG. 6C is a graph of the ferrate concentration over time, showing that ferrate concentration increased linearly throughout the process at a rate of approximately ⅓ millimolar per minute. Further experiments indicated that this linear production rate held constant for long periods of time and ferrate concentrations in excess of 150 millimolar were obtained after operation for about 6 hours. The average ferrate production rate was 0.34 mM/min.

EXAMPLE 5

This example is of the production of ferrate (VI) using a porous frit to separate the anode and cathode. The following conditions apply to example 5. The anode and cathode materials used in the following examples were a mesh of 1008 carbon steel (containing iron and less than 0.1% carbon, 0.5% manganese, 0.04% phosphorous, 0.05% sulfur) having a surface area of approximately 5.7 cm$^2$/g. The anode was a flat sheet of mesh measuring 10 cm high×21 cm wide wrapped to form a cylindrical shell 10 cm high and 6.7 cm in diameter with a mass of 119 grams. The cathode consisted of a strip of mesh 10 cm high and 2 cm wide. A 20 amp current was applied to the cell, giving a current density at the anode of 30 mA/cm$^2$. The cell used for this example had no inlets or outlets and the electrolyte (800 ml) was not circulated. Ferrate concentration in solution was determined by UV/VIS spectroscopy at 505 nm and at this wavelength, the ferrate extinction coefficient is 1070 M$^{-1}$ cm$^{-1}$.

Figure 7:
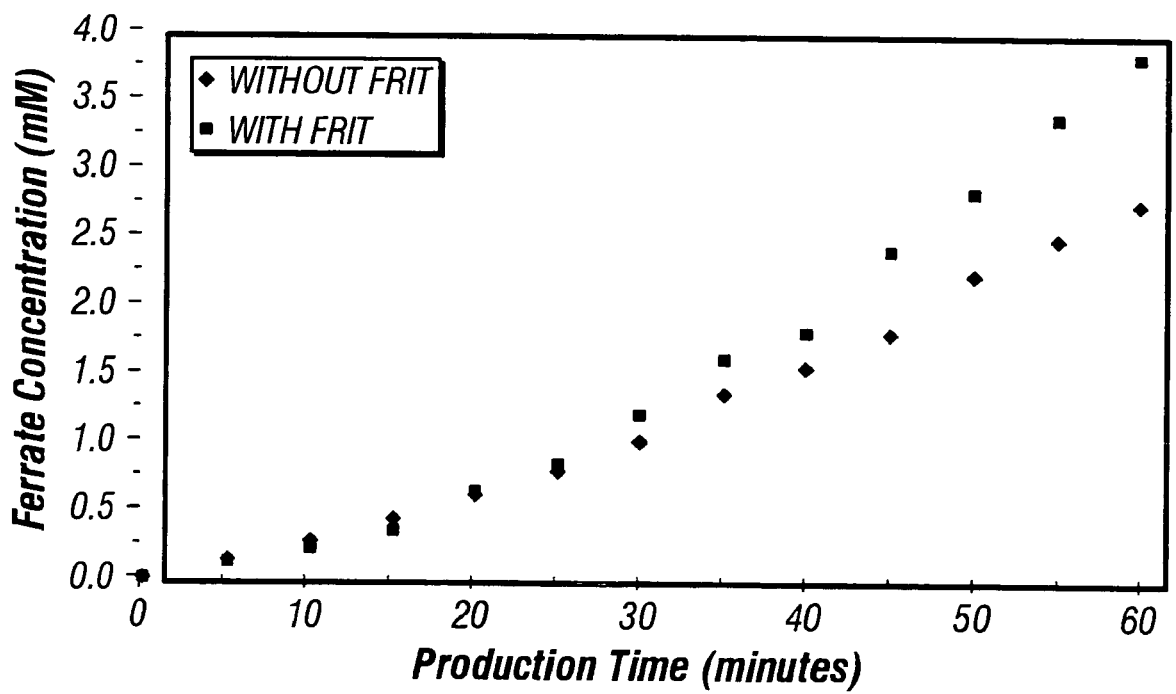
FIG. 7 is a graph of the ferrate concentration over time with and without a frit inserted between the anode and the cathode.

First, the cell was run for 60 minutes with no frit with the results as shown in FIG. 7. The second portion of this example involved placing a porous frit around the cathode, which hindered the generated ferrate (at the anode) from coming into contact with the cathode surface. As can be seen in FIG. 7, the use of the frit initially hinders the productivity of the cell, but after 20 minutes the frit enhances the production and efficiency of the ferrate production. The results shown in FIG. 7 suggested the desirability of having a first cell with no porous separator or frit to maximize initial ferrate production, followed by a second cell in series with a porous separator to achieve higher concentrations of ferrate.

EXAMPLE 6

This example is for the Extraction of Potassium Ferrate Salt Using a Magnetic Separator. For this example potassium ferrate was produced in the same manner as described in Example 4. The resulting ferrate KOH/NaOH mixture was then processed according to this example to extract potassium ferrate salt crystals using a magnetic separator. When using the magnetic separator 40 shown in FIG. 3, solid potassium ferrate particles that are highly magnetic were removed from the methanol solution and the concentration of the remaining solution was measured periodically to determine the rate of ferrate removal.

Figure 8:
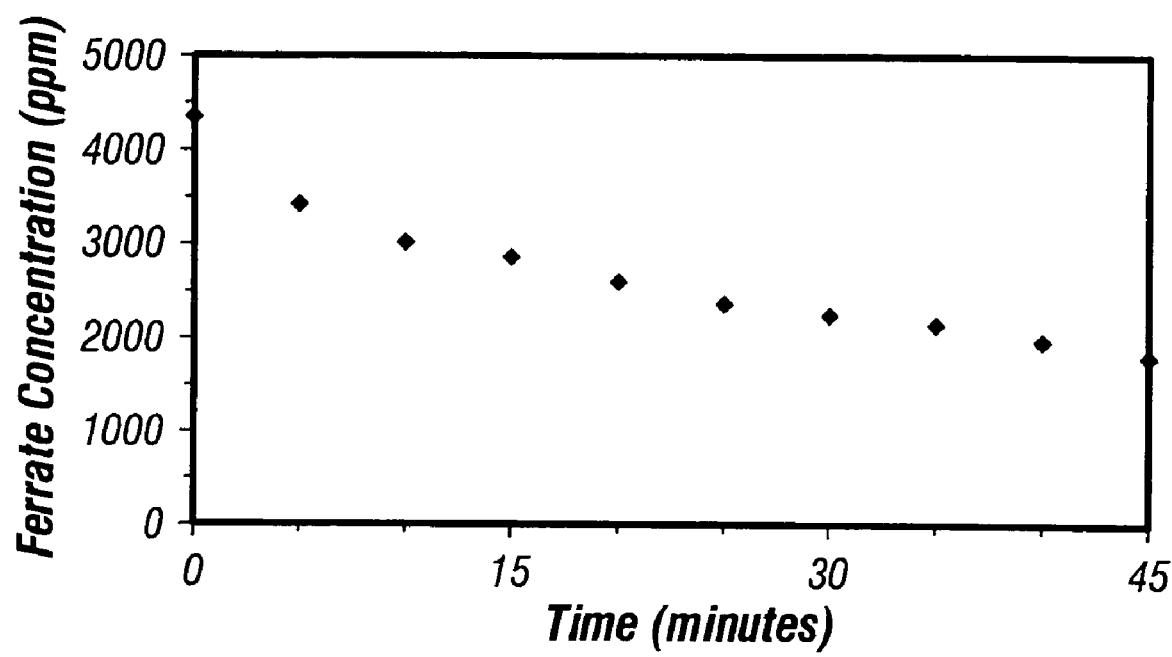
FIG. 8 is a graph of the ferrate concentration over time during magnetic removal of the ferrate from an electrolyte/ferrate mixture.

As shown in FIG. 8 over a period of 45 minutes the magnetic separator will remove approximately 2500 ppm of solid potassium ferrate, or a removal rate of 55 ppm/min can be established for removing potassium ferrate from solution. In the case of Example 4, having the hydroxide electrolyte mixture shown in FIG. 6C, a potassium ferrate production rate of 0.34 mM/min was obtained. This rate correlates to producing approximately 67 ppm/min, which is of similar magnitude to the potassium ferrate removal rate. Consequently, this example shows that a continuous production process utilizing magnetic separation is feasible.

It will be understood from the foregoing description that various modifications and changes may be made in the preferred embodiment of the present invention without departing from its true spirit. It is intended that this description is for purposes of illustration only and should not be construed in a limiting sense. The scope of this invention should be limited only by the language of the following claims.

What is claimed is:

1. An apparatus for electrochemical production of a ferrate salt, comprising:
    an electrochemical cell having an iron-containing anode, cathode, and an aqueous hydroxide solution in fluid communication with both the anode and the cathode; and
    a magnetic separator in fluid communication with the aqueous hydroxide solution for separating ferrate salts from the aqueous hydroxide solution.

2. The apparatus of claim 1, wherein the aqueous hydroxide solution comprises a hydroxide selected from sodium hydroxide, potassium hydroxide, lithium hydroxide, cesium hydroxide, barium hydroxides, and combinations thereof.

3. The apparatus of claim 1, wherein the aqueous hydroxide solution comprises a hydroxide selected from alkali earth metal hydroxides, alkaline earth metal hydroxides and combinations thereof.

4. The apparatus of claim 1, wherein the aqueous hydroxide solution has a hydroxide concentration between about 1 molar and about 30 molar.

5. The apparatus of claim 1, wherein the aqueous hydroxide solution has a hydroxide concentration of between about 5 molar and 20 molar.

6. The apparatus of claim 1, wherein the aqueous hydroxide solution has a hydroxide concentration of between about 10 molar and about 20 molar.

7. The apparatus of claim 1, wherein the aqueous hydroxide solution comprises a mixture of sodium hydroxide and potassium hydroxide.

8. The apparatus of claim 7, wherein the mixture has a molar ratio of potassium hydroxide to sodium hydroxide between about 1 and about 3.

9. The apparatus of claim 7, wherein the mixture has a molar ratio of potassium hydroxide to sodium hydroxide up to about 5.

10. The apparatus of claim 7, wherein the aqueous hydroxide solution comprises between about 5 molar and about 15 molar NaOH and between about 5 molar and about 15 molar KOH.

11. The apparatus of claim 1, wherein the anode has an iron content of between 90% and 100%.

12. The apparatus of claim 1, wherein the anode has an iron content greater than about 99%.

13. The apparatus of claim 1, wherein the anode is made of material selected from iron, cast irons, malleable iron, ductile iron, carbon steels, stainless steels and combinations thereof.

14. The apparatus of claim 1, wherein the anode has a configuration selected from expanded metal mesh, wire mesh, woven metal cloth, flat plate, rod and combinations thereof.

15. The apparatus of claim 1, wherein the cathode is made of material selected from iron, iron alloys, nickel, nickel alloys, and carbon.

16. The apparatus of claim 1, wherein the cathode is made of material selected from iron, cast irons, malleable iron, ductile iron, carbon steels, stainless steels and combinations thereof.

17. The apparatus of claim 1, wherein the cathode is made of material selected from nickel, nickel-molybdenum alloys, nickel-vanadium alloys and combinations thereof.

18. The apparatus claim 1, wherein the cathode has a configuration selected from expanded metal mesh, wire mesh, woven metal cloth, flat plate, rod and combinations thereof.

19. The apparatus of claim 1, wherein the anode is shaped in a form selected from arcuate or cylindrical, and wherein the cathode is positioned along an axis of the anode.

20. The apparatus of claim 1, further comprising a porous frit, wherein the frit is placed between the cathode and anode.

\* \* \* \* \*